United States Patent
Hsu et al.

(10) Patent No.: US 10,935,850 B1
(45) Date of Patent: Mar. 2, 2021

(54) DISPLAY PANEL, MANUFACTURING METHOD, AND ELECTRONIC DEVICE

(71) Applicant: BEIJING XIAOMI MOBILE SOFTWARE CO., LTD., Beijing (CN)

(72) Inventors: Che-Jui Hsu, Beijing (CN); Tsang-chih Wu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/802,079

(22) Filed: Feb. 26, 2020

(30) Foreign Application Priority Data

Oct. 18, 2019 (CN) .......................... 201910994222.2

(51) Int. Cl.
*G02F 1/1339* (2006.01)
*G02F 1/1335* (2006.01)

(52) U.S. Cl.
CPC .... *G02F 1/13394* (2013.01); *G02F 1/133512* (2013.01); *G02F 2001/13398* (2013.01)

(58) Field of Classification Search
CPC .................................................. G02F 1/13394
See application file for complete search history.

(56) References Cited

U.S. PATENT DOCUMENTS

| 2013/0169913 | A1* | 7/2013 | Choi ................... G02F 1/13394 |
| | | | 349/110 |
| 2020/0103690 | A1* | 4/2020 | Wu ..................... G02F 1/136209 |
| 2020/0333650 | A1* | 10/2020 | Ma ..................... G02F 1/133514 |

FOREIGN PATENT DOCUMENTS

| CN | 108761885 | 11/2018 |
| CN | 109116636 | 1/2019 |
| CN | 109688308 | 4/2019 |

OTHER PUBLICATIONS

Supplementary European Search Report dated Aug. 10, 2020, in corresponding European Patent Application No. 20160605.0, 9 pages.

* cited by examiner

*Primary Examiner* — Edmond C Lau
(74) *Attorney, Agent, or Firm* — Oblon, McClelland, Maier & Neustadt, L.L.P.

(57) ABSTRACT

Aspects of the disclosure provide a display panel that can include a display region, a blind hole arranged in the display region for light passage, and a light-shielding region arranged between the display region and a hole region. The display panel can also include a Photo Spacer (PS) structure that is arranged in a liquid crystal layer in the display region and the light-shielding region for supporting the cell thickness of the liquid crystal layer. The density of the PS structure in the liquid crystal layer increases and then decreases from the display region to the light-shielding region, with the density of the PS structure in the light-shielding region is highest.

20 Claims, 6 Drawing Sheets

DISPLAY PANEL, MANUFACTURING METHOD, AND ELECTRONIC DEVICE

CROSS-REFERENCE TO RELATED APPLICATIONS

This application is based upon and claims priority to Chinese Patent Application No. 201910994222.2 filed on Oct. 18, 2019, the entire contents of which are incorporated herein by reference.

TECHNICAL FIELD

The disclosure relates to the technical field of display, and more particularly, to a display panel and an electronic device.

BACKGROUND

With the development of a display technology, users have increasingly higher requirements for display devices such as mobile phones. A screen-to-body ratio is one of the users' concerns. For display devices such as a mobile phone, a front camera is one of the main structures that can influence the screen-to-body ratio.

SUMMARY

Aspects of the disclosure can reduce the influence of a front camera on the screen-to-body ratio. According to a first aspect of the embodiments of the disclosure, a display panel is provided. The display panel may include a display region, a blind hole arranged in the display region for light passage, and a light-shielding region arranged between the display region and a hole region of the blind hole. The embodiment can further include a Photo Spacer (PS) structure, arranged in a liquid crystal layer in the display region and the light-shielding region for supporting a cell thickness of the liquid crystal layer. Accordingly, a density of the PS structure in the liquid crystal layer may increase and then decrease from the display region to the light-shielding region, and the density of the PS structure in the light-shielding region may be highest.

According to a second aspect of the embodiments of the disclosure, an electronic device is provided. The electronic device may include the display panel described above.

The technical solutions provided by the embodiments of the disclosure may include beneficial effects. For example, it can be known from the foregoing embodiments that, in a case that the display panel is applied to an electronic device such as a mobile phone, an image acquisition device as a front camera may be arranged in the hole region and located on a side of the display panel away from a light emitting direction, so that the image acquisition device can be arranged under the display panel. Since the degree of deformation of the surface of the liquid crystal layer in the hole region is reduced, the curvature of a lens formed by the liquid crystal layer in the hole region due to deformation can be reduced, thereby reducing an influence of the liquid crystal layer in the hole region on an optical path, and reducing a bad influence on optical characteristics of the image acquisition device below the hole region in order to ensure that the image acquisition device has a good effect in image acquisition.

It is to be understood that the above general descriptions and detailed descriptions below are only exemplary and explanatory and not intended to limit the disclosure.

BRIEF DESCRIPTION OF THE DRAWINGS

The accompanying drawings, which are incorporated in and constitute a part of this specification, illustrate embodiments consistent with the disclosure and, together with the specification, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

In order to increase a screen-to-body ratio, a front camera is often arranged under a screen to capture a picture on a light emitting side of the screen through the camera under the screen.

For a liquid-crystal display panel, in order to arrange a camera under a screen, a method is to form a blind hole in a display region of the liquid-crystal display panel. A liquid crystal layer can be retained in a hole region of the blind hole without structures such as a color filter and a black matrix in a color film substrate, or structures such as a thin-film transistor, a gate line and a data line in an array substrate, so as to ensure a high light transmittance in the hole region. Then, the camera can be arranged in the hole region, and a light-shielding region can be also arranged between the hole region and the display region. A relationship among the hole region, the display region, and the light-shielding region is shown in FIG. 1.

In order to maintain the cell thickness of a liquid crystal cell in the liquid crystal display panel, a Photo Spacer (PS) column may be arranged in the liquid crystal layer to support the color film substrate and the array substrate on both sides of the liquid crystal layer. In order to prevent the PS column from degrading the light transmission performance of the hole region, a PS column may not be formed in the liquid crystal layer in the hole region. For the hole region, the PS column arranged in the light-shielding region is mainly used to support the cell thickness of the liquid crystal cell in the hole region.

Figure 1:
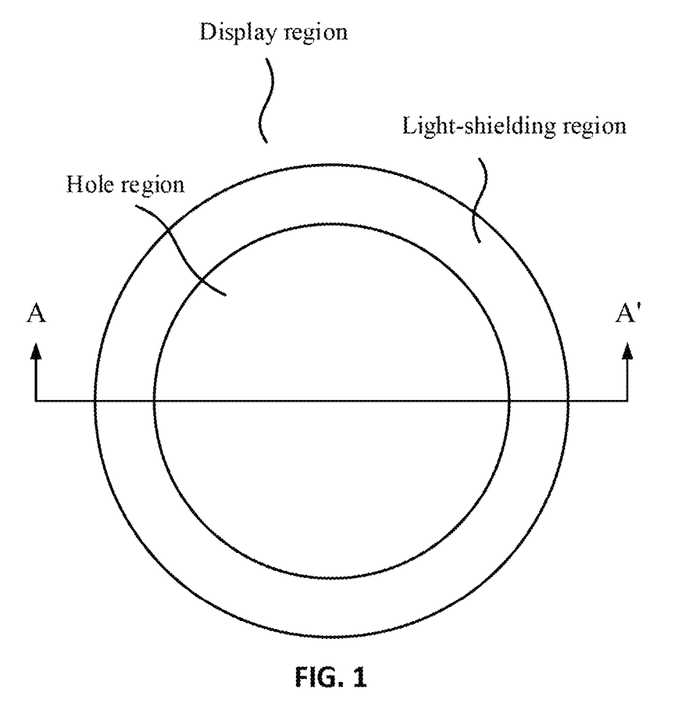
FIG. 1 is a schematic diagram illustrating a relationship among a hole region, a display region and a light-shielding region.
Figure 2:
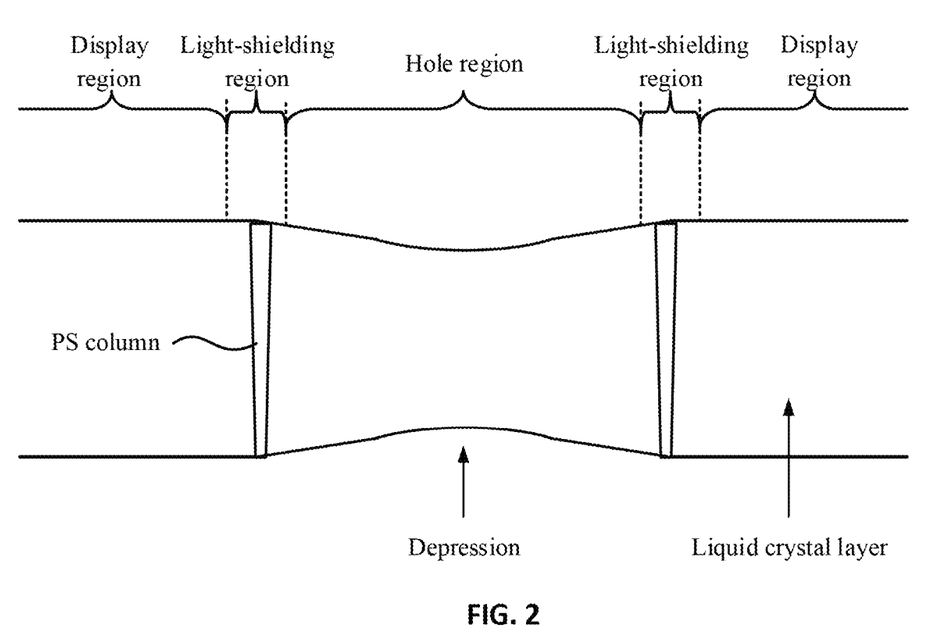
FIG. 2 is a schematic diagram of a cross section taken along AA' of the structure shown in FIG. 1.

FIG. 2 is a schematic diagram of a cross section taken along AA' of the structure shown in FIG. 1. As shown in FIG.

2, since the PS column is not arranged in the liquid crystal layer in the hole region and the PS column arranged in the light-shielding region outside the hole region may serve as a fulcrum, the surface of the liquid crystal layer in the hole region may have a large depression, and there may be a certain degree of uplift in the display region outside a PS region, so that a concave lens-like structure may be formed in the hole region, which may adversely affect the optical characteristics of an image acquired by a lens below the hole region.

Figure 3:
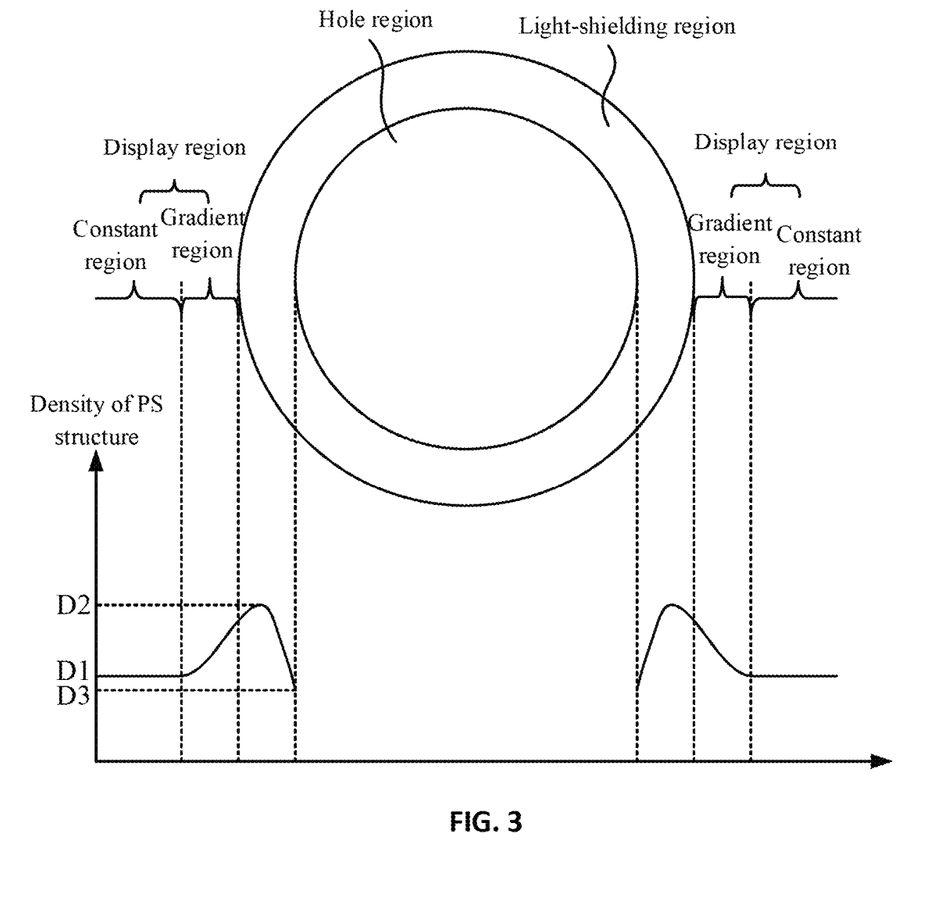
FIG. 3 is a schematic diagram illustrating the density of a PS according to an exemplary embodiment of the disclosure.

FIG. 3 is a schematic diagram illustrating the density of a PS according to an embodiment of the disclosure.

The embodiments of the disclosure provide a display panel. The display panel can be a liquid-crystal display panel. The display panel may be applied to an electronic device having a display function. The electronic device may include, but is not limited to, a mobile phone, a tablet, and a wearable device.

As shown in FIG. 3, the display panel can include a display region, a blind hole arranged in the display region for light passage, and a light-shielding region arranged between the display region and a hole region of the blind hole. An array substrate, a color filter substrate, and a liquid crystal layer may be arranged in the display region and the light-shielding region, and the liquid crystal layer may be arranged in the hole region.

It is to be noted that neither structures such as a color filter and a black matrix in the color filter substrate nor structures such as a thin-film transistor, a gate line, and a data line in the array substrate are arranged in the hole region, so as to ensure good light transmission performance in the hole region. In order to maintain the structural stability of the hole region, a transparent substrate in the color filter substrate and a transparent substrate in the array substrate may be retained in the hole region, and structures such as a pixel electrode, a common electrode, an alignment layer, and a polarizer may be further retained.

A PS structure may be arranged in a liquid crystal layer in the display region and the light-shielding region for supporting the cell thickness of the liquid crystal layer. The density of the PS structure in the liquid crystal layer from the display region to the light-shielding region may increase and then decrease, and the density of the PS structure in the light-shielding region may be highest.

In one embodiment, a PS structure, such as a PS column and a PS ball, may be arranged in the liquid crystal layer in the display region and the light-shielding region to support the cell thickness of the liquid crystal layer. The density of the PS structure in the liquid crystal layer may increase and then decrease from the display region to the light-shielding region, and the density of the PS structure in the light-shielding region may be highest.

For example, as shown in FIG. 3, from the display region to the light-shielding region, the density of the PS structure in the liquid crystal layer increases from D1 to D2 and then decreases from D2 to D3. The density of a PS structure is as highest as D2. The density of the PS structure reaches D2 in the light-shielding region.

When the density of the PS structure is higher, the support effect on the liquid crystal layer is stronger, and the cell thickness of the liquid crystal layer is more stable. On the contrary, when the density of the PS structure is lower, the support effect on the liquid crystal layer is weaker, and the cell thickness of the liquid crystal layer is more unstable. Therefore, the cell thickness of the liquid crystal layer may be larger in a region with a higher density of the PS structure, and the cell thickness of the liquid crystal layer may be smaller in a region with a lower density of the PS structure.

Since the highest density of the PS structure appears in the light-shielding region, the PS structure can provide the biggest support to the liquid crystal layer at the position where the highest density of the PS structure appears in the light-shielding region. Along the direction from the highest density of the PS structure to a decreased density of the PS structure, the support effect of the PS structure on the liquid crystal layer may be gradually reduced. Since the support from the PS structure to the liquid crystal layer is changed, the cell thickness of the liquid crystal layer may also change, so that the surface of the liquid crystal layer may be deformed.

In a region where the density of the PS structure changes (such as a gradient region shown in FIG. 3) and the light-shielding region in the display region, the surface of the liquid crystal layer may be deformed due to the change of the PS structure. The surface of the liquid crystal layer can be deformed due to the tension, but the tension on the surface of the liquid crystal layer is not very large, so the degree of deformation is very limited.

Since the surface of the liquid crystal layer is deformed in the light-shielding region and the gradient region outside the hole region, and the degree of deformation of the overall surface of the liquid crystal layer is limited, the degree of surface deformation of the liquid crystal layer in the hole region can be reduced, thereby alleviating the surface deformation of the liquid crystal layer in the hole region.

In a case that the display panel in the present embodiment is applied to an electronic device such as a mobile phone, an image acquisition device as a front camera may be arranged in the hole region and located on a side of the display panel away from a light emitting direction, so that the image acquisition device can be arranged under the display panel. Since the degree of deformation of the surface of the liquid crystal layer in the hole region is reduced, the curvature of a lens formed by the liquid crystal layer in the hole region due to deformation can be reduced, thereby reducing an influence of the liquid crystal layer in the hole region on an optical path, and reducing a bad influence on optical characteristics of the image acquisition device below the hole region in order to ensure that the image acquisition device has a good effect in image acquisition.

It is to be noted that the present embodiment not only is suitable for arranging a camera under a screen, but also may arrange other structures that require lighting, such as a light sensor, in the hole region and on a side of the display panel away from a light emitting direction, so as to arrange other lighting structures under the display panel.

In addition, the PS structure may be set to have different heights to overcome the above technical problems, but the PS structure of different heights has different optical characteristics, which may greatly affect the display effect of the display region. In the present embodiment, the height of the PS structure is not changed. For example, the height of the PS structure may be set to be the same, so as to prevent the display effect of the display region from being affected by different heights of the PS structure.

Figure 4:
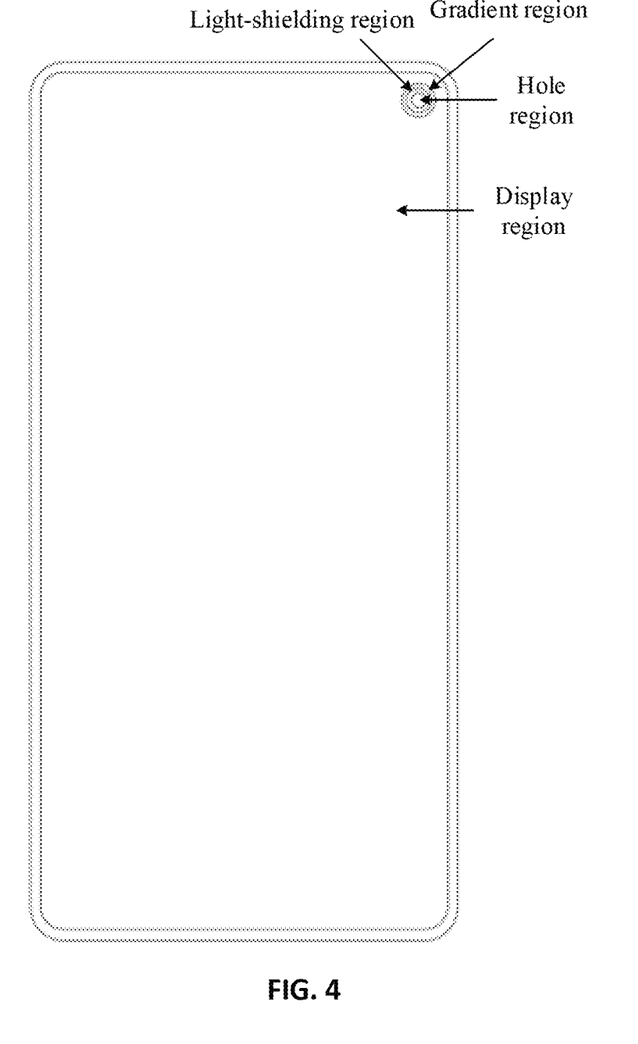
FIG. 4 is a schematic structural diagram of an electronic device according to an embodiment of the disclosure.

FIG. 4 is a schematic structural diagram of an electronic device according to an exemplary embodiment of the disclosure. In one embodiment, an electronic device is a mobile phone for example. It is assumed that a front camera needs to be arranged in the electronic device. As shown in FIG. 4, a blind hole may be formed on the display panel in the foregoing embodiment. A light-shielding region may be arranged outside a hole region of the blind hole. A gradient region may be arranged outside the light-shielding region. The front camera may be arranged in the hole region and located on a side of the display panel away from a light emitting direction. Thus, the front camera is not required to be arranged on the front surface of the mobile phone, so that the screen-to-body ratio can be reduced, which is conducive to achieving a full screen.

It is to be noted that the position where the blind hole may be arranged may be set according to the position of the front camera. For example, the blind hole may be formed at the upper right of the display panel as shown in FIG. 4, or may also be formed at other positions as needed.

Figure 5:
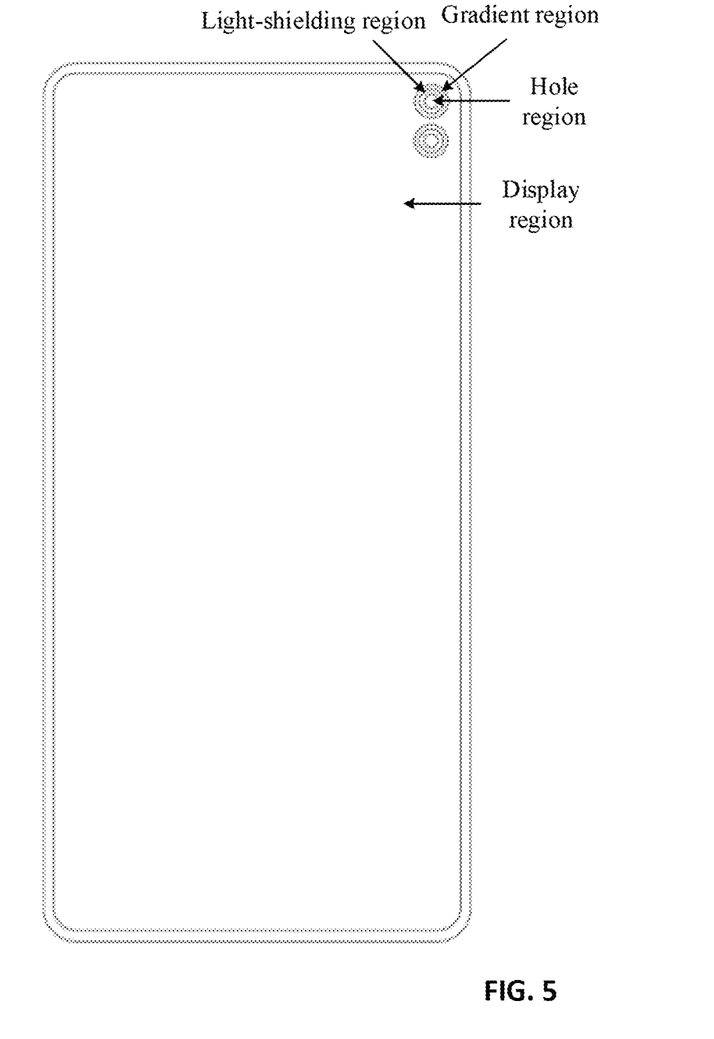
FIG. 5 is a schematic structural diagram of another electronic device according to an exemplary embodiment of the disclosure.

FIG. 5 is a schematic structural diagram of another electronic device according to an embodiment of the disclosure. In one embodiment, a plurality of front cameras may be arranged in the electronic device. For example, two front cameras are arranged. As shown in FIG. 5, two blind holes may be formed on the display panel in the foregoing embodiment.

In an example, a minimum value of the density of the PS structure in the light-shielding region may be lower than a minimum value of the density of the PS structure in the display region. In one embodiment, a minimum value of the density of the PS structure in the light-shielding region may be set to be lower than a minimum value of the density of the PS structure in the display region. For example, as shown in FIG. 3, the minimum value of the density of the PS structure in the light-shielding region is D3, which may be lower than the minimum value D1 of the density of the PS structure in the display region.

Accordingly, the density of the PS structure at a junction between the light-shielding region and the hole region may be set as low as possible, which is conducive to reducing the effect of support of the PS structure at the junction, so that the deformation difference of the liquid crystal layer generated at the junction can be as small as possible, which is conducive to ensuring that the degree of overall deformation of the liquid crystal layer from the edge of the hole region to the interior of the hole region is small, and ensuring that the curvature of a lens formed by the liquid crystal layer in the hole region due to the deformation can be effectively reduced.

In an example, the PS structure may include at least one of the following: a PS column and a PS ball.

In an example, the PS structure may include a PS column, and the PS column may be a main PS column. In one embodiment, the PS column may be selected as a PS structure to support the liquid crystal layer, and the PS ball may be selected as a PS structure to support the liquid crystal layer.

In the case where the PS column is used to support the liquid crystal layer, a main PS column may be used to support the liquid crystal layer. The PS column may include two types: a main PS column and a sub PS column (also referred to as a sub-PS column). The length of the main PS column may be greater than that of the sub PS column, and in a case that the liquid crystal layer is not deformed, the cell thickness of the liquid crystal layer can be supported, and the support effect on the liquid crystal layer can be guaranteed.

In an example, the display region may include a first region and a second region. A distance from the second region to the light-shielding region may be smaller than a preset distance. A distance from the first region to the light-shielding region may be greater than the preset distance.

The density of the PS structure in the liquid crystal layer in the second region may gradually increase from a direction away from the light-shielding region to a direction close to the light-shielding region. The density of the PS structure in the liquid crystal layer in the first region may be constant.

In one embodiment, a PS structure may be also needed in the liquid crystal layer in the display region to support the cell thickness of the liquid crystal layer. The density of the PS structure in a first region away from the light-shielding region (for example, greater than a preset distance) may be set to be constant, and the density of the PS structure in a second region closer to the light-shielding region (for example, smaller than the preset distance) may be changed.

Accordingly, it can be ensured that the density of the PS structure is the same in a large part of the display region, and the density of the PS structure is changed only in a small part of the region near the hole region, so that it can be ensured that the display effect on a large part of the display region is influenced by the PS structure to the same degree, and only a small part of the region is influenced by the PS structure to different degrees. It is beneficial to ensure that the difference among the display effect of a large part of the display region in the display region is small and the display effect is good.

As shown in FIG. 3, the display region includes a constant region (that is, the first region) where the density of the PS structure remains constant, and a gradient region (that is, the second region) where the density of the PS structure changes. The gradient region is closer to the light-shielding region, and the constant region is away from the light-shielding region. In the constant region, due to the same density of the PS structure, the display effect of the constant region may be influenced by the PS structure to the same degree, and only the gradient region may be influenced by the PS structure to different degrees. The hole region and the light-shielding region are only small-size hole structures in the display region, so the size of the gradient region around the light-shielding region is also small. Therefore, it can be ensured that the difference among the display effect of a large part of the display region (that is, the constant region) is small and the display effect is good.

In an example, the density of the PS structure may be continuously changed. In one embodiment, since the effect of support of the PS structure with different densities on the liquid crystal layer is different, the effect of support of the PS structure on the liquid crystal layer may be continuously changed by continuously changing the density of the PS structure, so that the influence effect of the PS structure on the display region can be continuously changed, it can be ensured that the display effect of the display region is continuously changed due to the density change of the PS structure, and it is not easy to cause excessive influence on the viewing experience of users.

In an example, the density of the PS structure may increase according to a first change rate, and/or decrease according to a second change rate. In one embodiment, the density of the PS structure may increase according to a fixed first change rate, and the density of the PS structure may decrease according to a fixed second change rate. By changing the density of the PS structure according to a fixed change rate, it is convenient to determine the change rule of the PS structure when the PS structure is formed, so that the density of the formed PS structure can be changed accurately according to the set change rate.

In an example, a black matrix may be arranged in the display region, and a material for light shielding in the light-shielding region may be the same as a material of the black matrix. In one embodiment, the material of the black matrix may be used to form a material for light shielding in the light-shielding region, so that when the black matrix in the display region is formed, a structure for light shielding in the light-shielding region may be formed. The light-shielding region may be manufactured without a separate process, which is conducive to simplifying the manufacturing process of the display panel.

The light-shielding region may block light in the display region from entering the hole region, so as not to affect an image acquired by the image acquisition device in the hole region.

The embodiments of the disclosure also provide an electronic device. The electronic device includes the display panel according to any one of the foregoing embodiments.

The electronic device may include, but is not limited to, an electronic device such as a mobile phone, a tablet and a wearable device. For example, the electronic device may further include an image acquisition device, arranged in the hole region, and located on a side of the display panel away from a light emitting direction. In one embodiment, the image acquisition device arranged in the hole region may refer to the entire image acquisition device or a lens of the image acquisition device.

The image acquisition device may be used as a front camera in the electronic device. The image acquisition device may be arranged in the hole region and located on the side of the display panel away from the light emitting direction. It is not necessary to place the image acquisition device on the front surface of the electronic device, which is convenient for providing a display region with a higher screen-to-body ratio on the front surface of the electronic device and achieving a full screen based on a liquid crystal display panel.

Moreover, the PS structure in the liquid crystal layer may be arranged based on the foregoing embodiments, so that the curvature of a lens formed by a liquid crystal layer in a hole region due to deformation can be reduced, thereby reducing an influence of the liquid crystal layer in the hole region on an optical path, and reducing a bad influence on optical characteristics of an image acquisition device below the hole region in order to ensure that the image acquisition device has a good effect in image acquisition.

Figure 6:
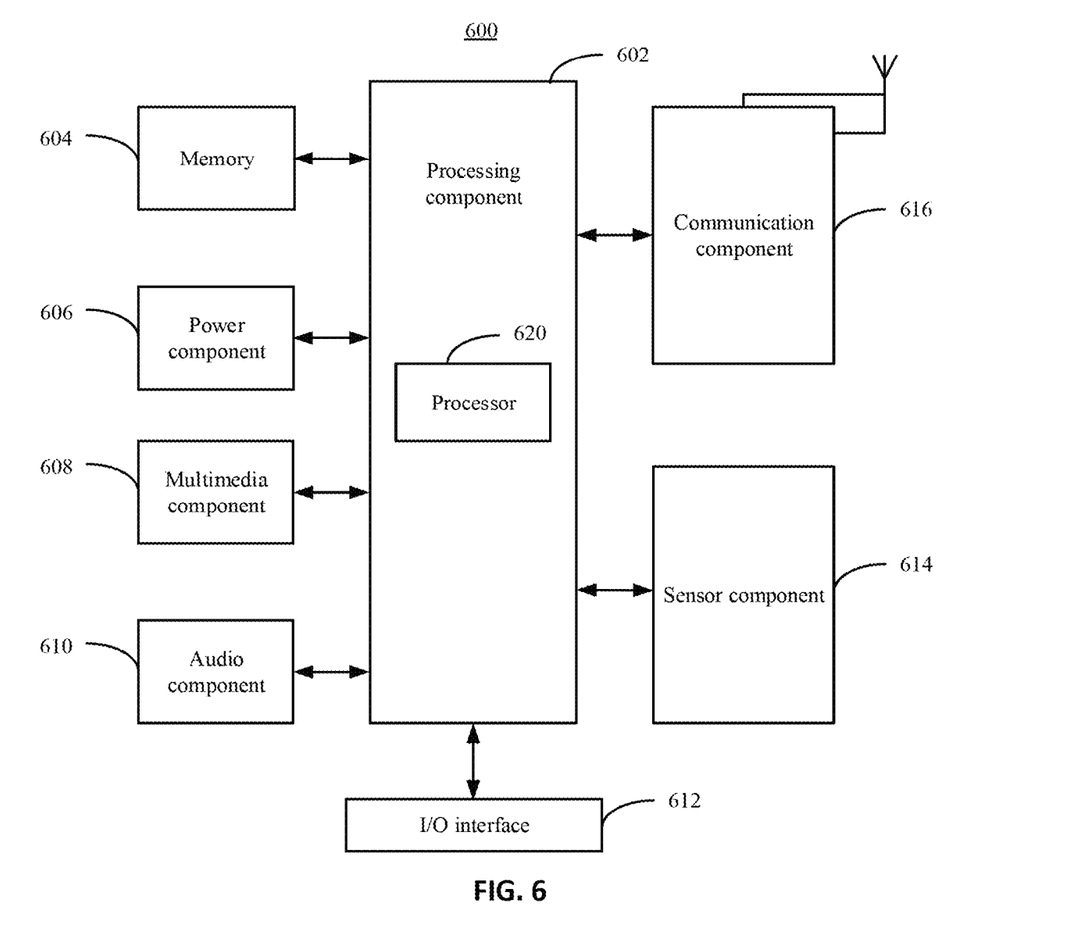
FIG. 6 is a schematic block diagram of an electronic device according to an exemplary embodiment of the disclosure.

FIG. 6 is a schematic block diagram of an electronic device 600 according to an exemplary embodiment of the disclosure. For example, the electronic device 600 may be a mobile phone, a computer, a digital broadcast terminal, a messaging device, a gaming console, a tablet, a medical device, exercise equipment, a personal digital assistant, and the like.

Referring to FIG. 6, the electronic device 600 can include a processing component 602, a memory 604, a power component 606, a multimedia component 608, an audio component 610, an Input/Output (I/O) interface 612, a sensor component 614, and a communication component 616.

The processing component 602 is typically configured to control overall operations of the electronic device 600, such as operations associated with display, telephone calls, data communications, camera operations, and recording operations. The processing component 602 may include one or more processors 620 to execute instructions. Moreover, the processing component 602 may include one or more modules which facilitate the interaction between the processing component 602 and other components. For example, the processing component 602 may include a multimedia module to facilitate the interaction between the multimedia component 608 and the processing component 602.

The memory 604 is configured to store various types of data to support the operation of the electronic device 600. Examples of such data may include instructions for any applications or methods operated on the electronic device 600, contact data, phonebook data, messages, pictures, video, etc. The memory 604 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 606 is configured to provide power to various components of the electronic device 600. The power component 606 may include a power management system, one or more power sources, and any other components associated with the generation, management and distribution of power in the electronic device 600.

The multimedia component 608 may include a screen providing an output interface between the electronic device 600 and the user. In some embodiments, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes and gestures on the TP. The touch sensors may not only sense a boundary of a touch or swipe action, but also sense a period of time and a pressure associated with the touch or swipe action. In some embodiments, the multimedia component 608 may include a front camera and/or a rear camera. The front camera and/or the rear camera may receive an external multimedia datum while the electronic device 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a Microphone (MIC) configured to receive an external audio signal when the electronic device 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 is configured to provide an interface between the processing component 602 and peripheral interface modules, such as a keyboard, a click wheel, or buttons. The buttons may include, but are not limited to, a home button, a volume button, a starting button, and a locking button.

The sensor component 614 may include one or more sensors to provide status assessments of various aspects of the electronic device 600. For example, the sensor component 614 may detect an open/closed status of the electronic device 600, and relative positioning of components. For example, the component is the display and the keypad of the electronic device 600. The sensor component 614 may also detect a change in position of the electronic device 600 or a component of the electronic device 600, a presence or absence of user contact with the electronic device 600 an orientation or an acceleration/deceleration of the electronic device 600, and a change in temperature of the electronic device 600. The sensor component 614 may include a proximity sensor configured to detect the presence of nearby objects without any physical contact. The sensor component 614 may also include a light sensor, such as a Complementary Metal Oxide Semiconductor (CMOS) or Charge Coupled Device (CCD) image sensor, for use in imaging applications. In some embodiments, the sensor component 614 may also include an acceleration sensor, a gyroscope sensor, a magnetic sensor, a pressure sensor, or a temperature sensor.

The communication component 616 is configured to facilitate communication, wired or wirelessly, between the electronic device 600 and other devices. The electronic device 600 may access a wireless network based on a communication standard, such as WiFi, 2G or 3G, 6G LTE, 5G NR, or a combination thereof. In one exemplary embodiment, the communication component 616 may receive a broadcast signal or broadcast associated information from an external broadcast management system via a broadcast channel. In one exemplary embodiment, the communication component 616 may further include a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In exemplary embodiments, the electronic device 600 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic elements.

In exemplary embodiments, there is also provided a non-transitory computer-readable storage medium having instructions stored thereon, which is included in such as the memory 604, executable by the processor 620 in the electronic device 600. For example, the non-transitory computer-readable storage medium may be a ROM, a Random Access Memory (RAM), a Compact Disc Read-Only Memory (CD-ROM), a magnetic tape, a floppy disc, an optical data storage device, and the like.

Other embodiments of the disclosure will be apparent to those skilled in the art from consideration of the specification and practice of the disclosure disclosed here. The disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A display panel, comprising:
   a display region;
   a blind hole that is arranged in the display region for light passage;
   a light-shielding region that is arranged between the display region and a hole region of the blind hole; and
   a Photo Spacer (PS) structure that arranged in a liquid crystal layer in the display region and the light-shielding region and configured to support a cell thickness of the liquid crystal layer,
   wherein a density of the PS structure in the liquid crystal layer increases and then decreases from the display region to the light-shielding region with the density of the PS structure in the light-shielding region being highest.

2. The display panel according to claim 1, wherein a minimum value of the density of the PS structure in the light-shielding region is lower than a minimum value of the density of the PS structure in the display region.

3. The display panel according to claim 1, wherein the PS structure comprises at least one of a PS column and a PS ball.

4. The display panel according to claim 3, wherein the PS structure further comprises a PS column that is a main PS column.

5. The display panel according to claim 1, the display region further comprising a first region and a second region, wherein:
   a distance from the second region to the light-shielding region is smaller than a preset distance,
   a distance from the first region to the light-shielding region is greater than the preset distance,
   the density of the PS structure in the liquid crystal layer in the second region gradually increases from a direction away from the light-shielding region to a direction adjacent to the light-shielding region, and
   the density of the PS structure in the liquid crystal layer in the first region is constant.

6. The display panel according to claim 1, wherein the density of the PS structure is continuously changed.

7. The display panel according to claim 6, wherein the density of the PS structure increases according to a first change rate, or decreases according to a second change rate.

8. The display panel according to claim 1, wherein a black matrix is arranged in the display region, and a material for light shielding in the light-shielding region is the same as a material of the black matrix.

9. An electronic device having a display panel, the display panel comprises:
   a display region,
   a blind hole that is arranged in the display region for light passage,
   a light-shielding region that is arranged between the display region and a hole region of the blind hole; and
   a Photo Spacer (PS) structure that arranged in a liquid crystal layer in the display region and the light-shielding region and configured to support a cell thickness of the liquid crystal layer,
   wherein a density of the PS structure in the liquid crystal layer increases and then decreases from the display region to the light-shielding region with the density of the PS structure in the light-shielding region being highest.

10. The electronic device according to claim 9, further comprising:
    an image acquisition device that is arranged in the hole region and located on a side of the display panel away from a light emitting direction.

11. The electronic device according to claim 10, wherein a minimum value of the density of the PS structure in the light-shielding region is lower than a minimum value of the density of the PS structure in the display region.

12. The electronic device according to claim 10, wherein the PS structure comprises at least one of a PS column and a PS ball.

13. The electronic device according to claim 12, wherein the PS structure comprises a PS column that is a main PS column.

14. The electronic device according to claim 10, wherein the display region comprises a first region and a second region, wherein:
- a distance from the second region to the light-shielding region is smaller than a preset distance,
- a distance from the first region to the light-shielding region is greater than the preset distance,
- the density of the PS structure in the liquid crystal layer in the second region gradually increases from a direction away from the light-shielding region to a direction adjacent to the light-shielding region, and
- the density of the PS structure in the liquid crystal layer in the first region is constant.

15. The electronic device according to claim 10, wherein the density of the PS structure is continuously changed.

16. The electronic device according to claim 15, wherein the density of the PS structure increases according to a first change rate, or decreases according to a second change rate.

17. The electronic device according to claim 10, wherein a black matrix is arranged in the display region, and a material for light shielding in the light-shielding region is the same as a material of the black matrix.

18. A method for manufacturing a display panel according to claim 1, the method comprising:
- arranging the blind hole in the display region for light passage,
- arranging the light-shielding region between the display region and the hole region of the blind hole; and
- arranging Photo Spacer (PS) structure in the liquid crystal layer in the display region and the light-shielding region for supporting the cell thickness of the liquid crystal layer,
- wherein a density of the PS structure in the liquid crystal layer increases and then decreases from the display region to the light-shielding region, with the density of the PS structure in the light-shielding region being highest.

19. The method of claim 18, wherein the display region comprises a first region and a second region, the method comprises:
- setting a distance from the second region to the light-shielding region to be smaller than a preset distance;
- setting a distance from the first region to the light-shielding region to be greater than the preset distance;
- increasing the density of the PS structure in the liquid crystal layer in the second region from a direction away from the light-shielding region to a direction adjacent to the light-shielding region; and
- maintaining the density of the PS structure in the liquid crystal layer in the first region to be constant.

20. The method of claim 18, further comprising:
arranging a black matrix in the display region, and
applying a same material as a material of the black matrix to the light-shielding region for light shielding.

* * * * *